United States Patent Office 3,097,662
Patented July 16, 1963

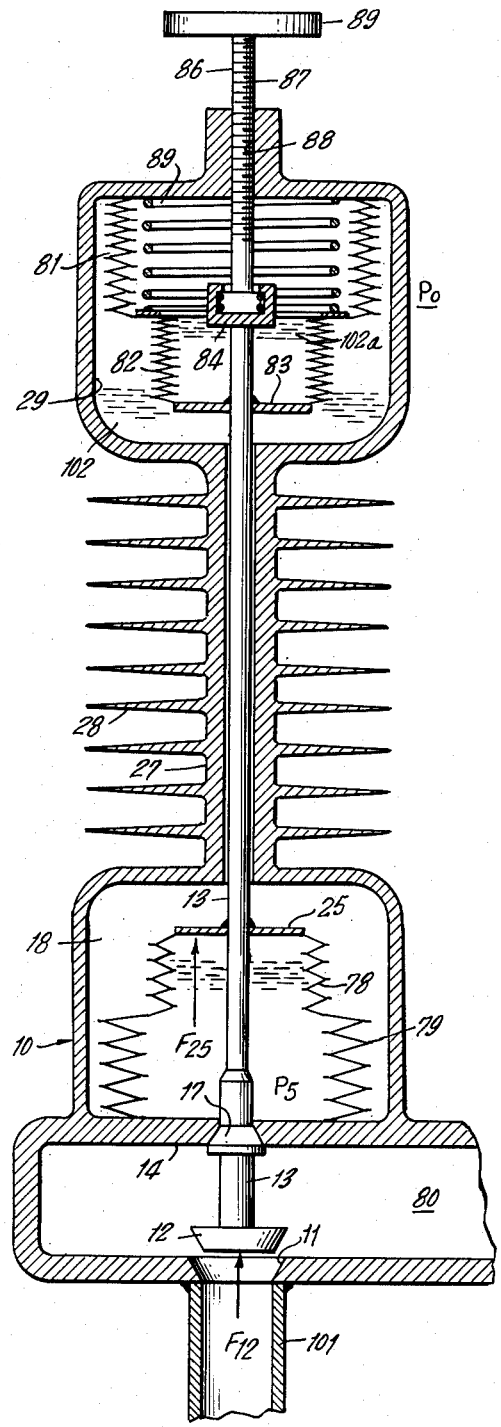

3,097,662
HIGH PRESSURE HIGH TEMPERATURE VALVE ASSEMBLIES
Melville F. Peters, Livingston, N.J., assignor of fifty percent to Joseph J. Mascuch, Millburn, N.J.
Filed Dec. 7, 1959, Ser. No. 857,612
2 Claims. (Cl. 137—338)

This invention relates to valves and more specifically to valves which are required to operate at high temperatures or high pressures or under conditions of both high temperatures and high pressure.

As the temperature of the moving parts of a valve exceed 1000° F., it becomes necessary to reduce and eventually eliminate the rubbing parts of the valve. The rubbing surfaces at these high temperatures will either gall, instead of slide, or will actually weld themselves together. These sliding and tight fitting surfaces can be eliminated by substituting supporting bellows for tight fitting valve stems, tight fitting pistons, cylinders, packing or stuffing boxes and so on, in all parts of the valve except the valve disc and valve seat which must of necessity have surfaces pressed together to seal the valve. Since it is necessary to assume that the surfaces of the valve disc and valve seat will stick or partially weld together when the valve is closed under conditions of high temperature, it is necessary to provide a means for applying a force to the valve stem which can separate or break the bond between the surfaces. Where gate valves are to be controlled it becomes necessary to supply a large force to seat the valve and a large force to unseat the valve, even though the sealing surfaces are not partially welded together. The force required to separate the partly welded surfaces can be developed when one end of the valve can be operated at a lower temperature by various mechanical devices such as a screw, or tight fitting piston employed in valves of conventional design.

However, when both ends of the valve are maintained at the higher temperatures it becomes necessary to eliminate all of these mechanical devices, together with bellows assemblies which are actuated by subjecting the assemblies to high pressure differentials. If the valve is completely enclosed in a chamber which is maintained at 1600° F., it is very difficult to control the opening and closing of the valve with known mechanical drives. In general, the control unit must then consist of fluid driven actuators.

Conventional bellows operated in valves with one end of the bellows hotter than the other end will have the hot end stretched much more than the cold end when the valve is opened and closed. If the temperature gradient between the two ends of the bellows is great enough, practically all of the movement will be done by a few of the hottest plates on the hot end of the bellows. These hottest bellows plates will be pulled out of shape, since they are forced to undergo a displacement which is several times greater than the displacement they would have to make if all of the bellows plates were contributing equally to the movement. This permanent distortion of the hot plates can only take place when the stresses in the plates are greater than the yield stress of the material and if the plates are made of age hardening material which loses its elongation when held within some particular temperature range, the plates in some part of the temperature gradient will crack. This over-stretching of the hot plates can be more readily realized by considering the stretching of a spring while a short length of the spring is heated by a Bunsen burner.

Conventional bellows employed in valves subjected to high pressure differential as well as high temperature and high temperature gradient will fail after a few hours of cycling. However, it has been found that if bellows are made and positioned in the valve assembly so that the plates will nest when subjected to a high pressure differential, the valve can be operated at high pressures and high temperatures without failing.

Accordingly, it is an object of the present invention to provide a valve capable of operating in the presence of high pressures and high temperatures for substantial periods of time.

Another object of the present invention is to use bellows assemblies arranged so that temperature gradients between the parts of each bellows assembly will be relatively small and temperature gradients which exist in the valve will be confined to the non-flexible elements of the valve.

Another object of the present invention is to provide valves in which assemblies of nesting type bellows are combined so that the pressure differential across the flexible element will remain small when the bellows is in its extended position.

A further object of the present invention is to provide a valve structure which may be used in systems requiring one end of the valve to be operated at a temperature very close to the melting point of one flexible seal while the seal in another part of the valve is maintained at a relatively low temperature.

An object of the present invention is to provide two or more bellows assemblies arranged so that the bellows assembly operating at the lowest temperature will be subjected to the greatest pressure differential.

Still another object of the present invention is to supply a liquid supporting surface for the bellows assembly operating at the highest temperature so that the greatest pressure differential is transmitted to the bellows assembly operating at the lowest temperature.

An object of the present invention is to provide means for applying a force to the valve stems which can separate or break the bond between the valve disc and the valve seat when these elements become partially welded together in the presence of extremely high temperatures.

A feature of the present invention is its use of bellows of the nesting type to control the operation of the valve.

Another feature of the present invention is its use of bellows having two diameters whereby volume changes in the fluids initiated by changes in temperature within the valve can be corrected without resulting in an excessive pressure differential across the bellows.

Still another feature of the present invention is its use of cooling means between the separate bellows assemblies.

Another feature of the present invention is the operation of a valve at a specified pressure differential with control bellows assemblies which are not affected by the absolute pressure.

The invention consists of the construction, combination and arrangement of parts as herein illustrated, described and claimed.

In the accompanying drawing forming a part hereof are illustrated five forms of embodiment of the invention in which:

The FIGURE in the drawing is a view in longitudinal section of a valve made in accordance with the present invention.

Bellows assemblies made up of two bellows of unequal size are hereinafter referred to as two diameter bellows assemblies. The importance of the two diameter bellows assemblies in the structure of the embodiment described herein lies in the fact that they can change their volume in response to changes in pressure without changing their overall length, and can, therefore, accommodate change in volume of confined liquids with changes in temperature without changing the setting of the valve. In addition, they can be used to control valves by the application of pressure thereto. By nesting type bellows is meant bellows formed of a series of washer-like plates alternately welded together at their inner and outer peripheries, which plates, when compressed, will nest or seat upon one another so that they will be supported over their entire surfaces or at least a large part thereof by the adjacent plates of the bellows. When the bellows are compressed and at least partially nested, they form, in effect, a tubular structure capable of withstanding great pressures.

Chambers 18, 29, and the space between valve stem 13 and the tubular element 27 of the valve body are filled with fluid 102. When this fluid is a liquid which at high temperatures will preferably be a molten metal, such as sodium, or potassium, or a mixture of sodium and potassium, the high pressure in chamber $P_5$ will be transmitted through the liquid 102 to the two diameter bellows assembly 81, 82, which assembly will either be nested or have a balancing pressure therein.

Since the bellows 81, 82, are of different diameters they can adjust their overall length depending upon the pressure differentials across them without altering the position of the valve disc 12 upon the valve seat 11. This structure is particularly important in the event that the valve is completely open and liquid is sealed in bellows 78, 79 by sealing disc 17, or completely closed at which point the valve stem 13 cannot be moved although changes in temperature may vary the pressure differential across the bellows 81, 82. The bellows 81 is to assure that the seal between 14, 17 is not broken by unequal expansion of the component parts of the valve.

The bellows 78, 79, in the lower control chamber 18 serve to seal the fluid passing through the valve from the remainder of the valve assembly. As has been previously pointed out these bellows 78, 79, are of different effective diameters and can adjust themselves as to volume without changing their overall length in response to pressure differentials across them. By reason of this adjustment the bellows are not destroyed even though sudden surges in pressure and changes in temperature may require rapid changes in the overall volume within the bellows 78, 79, in order to equalize the pressure differential across them.

Referring to the drawing, there is shown a valve assembly capable of operating across a substantial temperature gradient wherein the temperature of the valve disc of the structure is substantially higher than that at the control end.

The embodiment of the invention shown in the drawing consists of a valve housing 10 having a valve seat 11 at the bottom thereof, a valve disc 12 receivable within the valve seat 11 and attached to the end of a valve stem 13. The wall 14 divides the bottom of the housing 10 to form a control chamber 18 hereinafter referred to as the lower control chamber. An upper control chamber 29 is connected to the lower control chamber 18 by means of an elongated tubular member 27 above referred to as the valve stem guide. Fins 28 on the valve stem guide 27 serve to dissipate some of the heat in the lower portion of the housing 10 before it reaches the upper control chamber 29. A two diameter bellows 78, 79, is carried within the lower control chamber 18 and serves as a seal between the inlet chamber 80 of the valve housing 10 and the control chamber 18. The two diameter bellows 78, 79 is secured at its lower end to the top surface of the wall 14 and at its upper end to a disc 25 which in turn is secured to the valve stem 13. When the valve 11, 12 is fully opened the fluid in the inlet chamber 80 of the valve is sealed off from the fluid within the bellows 78, 79 by means of the sealing disc 17 seating on a tapered seat in wall 14. As a result of this construction if both of the two diameter bellows assemblies 78, 79 contained in the lower control chamber 18 and the two diameter bellows 81, 82 in the upper control chamber 29 should rupture, the fluid system can be operated without fluid escaping therefrom. The two diameter bellows assembly 81, 82 in the upper chamber 29 is secured at its lower end to a small disc 83 which is welded to the valve stem 13 within the chamber 29. The upper end of the two diameter bellows 81, 82 is secured as by welding to the top of the control chamber 29.

The top of the valve stem 13 in this embodiment terminates in a small bearing 84 in which there is held the lower end of the control rod 86. The control rod is threaded as indicated at 87 and received within a female thread 88 in the top of the upper control chamber 29. By turning the control rod 86 by means of the handle 89, the valve stem 13 can be raised or lowered without rotation of the said stem.

The sealing disc 17 serves to protect the bellows assembly from transient pressure waves that may develop within the system when the valve is open. These pressure waves might otherwise destroy the bellows by exceeding the safe working pressure of the bellows.

The chamber 18 should be kept at as near a constant temperature as is practical, so that the temperature of both bellows 78, 79 are approximately the same throughout their length. This is a necessary requirement to assure that each section of each bellows will elongate and compress an equal amount when the bellows is stretched or compressed. As previously stated the reason for this requirement can be readily seen by noting the unequal elongation of a spring when one end of the spring is cold and the other end is held in a Bunsen burner. This uniform change in length of each section of he bellows assembly when both bellows are maintained at the same temperature is true over any temperature range, a common range extending from −70° to 1500° F.

Since the strength of a metal decreases with temperature, a second bellows assembly 81, 82 is introduced into the cold end of the valve chamber 29 to serve as a mechanical support and seal for a liquid 102, which liquid in turn serves as a support for the bellows 78, 79, operating in the hot end of the valve. In this manner, the forces developed on the hot bellows 78, 79 by the pressure which is $(P_5-P_0)$ will be transferred to the cold bellows 81, 82. It is desirable to maintain these relatively cold bellows at a uniform temperature throughout their lengths.

When the fluid pressure $P_5$ acts on bellows assembly 78, 79, liquid 102 in chamber 18 will be forced into chamber 29 until the fluid pressure in both chambers 18 and 29 are equal, (where the weights of liquid 102, valve stem assembly and spring constants of the flexible elements can be neglected because the forces developed by these elements are small compared to the forces developed by the pressure $P_5$). Under these conditions the pressure differential across the hot bellows assembly 78, 79 will be negligible and the pressure differential between the pressure of the fluid in the system and the ambient pressure which is $(P_5-P_0)$ will be transferred to the cold bellows. This arrangement of bellows assemblies allows a material to be used for the bellows in the hot end of the valve which may be relatively weak but is able to withstand corrosion at high temperatures and allows material to be used in the cold end of the valve which is strong at low temperatures but is not necessarily good at high temperatures.

The tubular section 27 which houses the valve stem 13 is made very long so that the temperature gradient takes place in the rigid part of the valve and not in the flexible assemblies. This structure becomes important when an age hardening material such as Inconel X is used in the bellows assemblies, where one end of the bellows is operated at 1500° F. and the other end at 300° or 400° F. The section of the bellows in this gradient which is held at a temperature in the neighborhood of 1350° F. will lose its ductility. If the bellows is elongated while operating in the temperature gradient the hot section of the bellows will be elongated more than the cold section. The material in the hot zone of the bellows will thus be stretched beyond its elastic limit and since the ductility of the portion of the bellows operating in the hot zone has been reduced to a very low value, an opening and closing of the valve will cause the brittle section of the bellows to crack.

Since bellows assemblies 78—79, 81—82 in combination with chambers 18 and 29 form a sealed system filled with a liquid, it is necessary to have bellows 78 smaller than bellows 79 or bellows 82 smaller than bellows 81, so that either one or both of these bellows assemblies can change in volume without disturbing the setting of the valve as the temperature of liquid 102 and other parts of the valve change with changes in the operating conditions.

The spring 89 within the bellows 81 controls the extension of bellows 81 with respect to bellows 82. When necessary, a buffer pressure can be substituted for the spring 89. The buffer pressure can be applied to the interior of the bellows 81, 82, by means of a conduit (not shown). Failure of either the spring 89 or the buffer pressure need not damage the valve since bellows 81 and 82 will be nested when the valve is opened. When the valve is closed the two piston area bellows assembly 78, 79 will be nested and changes in volume of the assembly with changes in temperature will be compensated for by change in volume of bellows 81, 82, so that the pressure differential across the bellows in this assembly can never be more than a few pounds.

In safety valves it is often necessary to use control pressures which are equal to or greater than the high pressures in the system and consequently the flexible elements in the valve must be arranged so that a loss of the pressure on the system, or a loss of the control pressure, will cause all of the low pressure bellows to be protected by the nesting of one or more of the bellows assemblies before any one of the low pressure bellows in the valve can be damaged. In many systems both the operating and control pressures are above 2500 p.s.i. An additional operating requirement is that the safety valve must open at some specified pressure and this opening pressure must be independent of the ambient pressure. This latter requirement becomes severe in the submarine service where the ambient pressure of the submarine may change from 15 to 1000 p.s.i. in a matter of minutes.

From the foregoing it will be seen that there has been provided valve structures capable of controlling fluids under extremely high pressures and temperatures which will operate over prolonged periods of time and function despite conditions of partial welding of the valve disc to the valve seat and sudden and widespread variation in temperature and pressure within the fluid lines.

Having thus fully described the invention, what is claimed as new and desired to be secured by Letters Patent of the United States, is:

1. A valve assembly for controlling fluids at high temperatures comprising a housing, a ported valve seat in said housing, an inlet and an outlet valve passage connected to each side of said seat, a valve disk receivable upon the seat to control fluid passing through the valve seat, a valve stem secured at one end to the valve disk and extending therefrom within the housing, an hermetically sealed control chamber in the housing receiving said stem and having a lower portion adjacent the valve disk, a bellows within the lower control chamber portion around the valve stem, an opening in said housing communicating with said outlet valve passage and said chamber to conduct high temperature fluid within said outlet valve passage to the interior of said bellows, said bellows being hermetically sealed and secured at one end to said housing around said opening and at its opposite end to said valve stem to form a fluid receiving compartment within said bellows, said control chamber having an upper portion in the housing spaced from said lower portion, a bellow assembly within the upper portion of the control chamber around the valve stem, said bellows assembly secured at one end to the housing and at its opposite end to the valve stem, a quantity of liquid filling the space within said hermetically sealed control chamber and in contact with the outer surfaces of said bellows and bellows assembly, said housing including an elongated tubular heat dissipating valve guide portion interconnecting the lower and upper portions of said chamber and disposed about the valve stem whereby the high temperature impressed upon the bellows by the fluid passing through the valve is attenuated before reaching the bellows assembly in the upper portion of said control chamber, means connected to said valve stem to control the valve stem to open and close the valve, said bellows assembly including expansible and contractable portions of different diameters whereby the fluid in said sealed chamber may expand or contract without moving said valve stem, and spring means connected to said larger diameter portion of said bellows assembly, said spring means urging said larger diameter portion to an expanded configuration so as to reduce the effective volume of said chamber and apply pressure to the liquid therein.

2. A valve assembly as defined in claim 1, including a valve member secured to said valve stem adjacent said opening, said valve member arranged to close said opening when said valve disk is moved a predetermined distance from said seat.

References Cited in the file of this patent

UNITED STATES PATENTS

| | | |
|---|---|---|
| 1,576,608 | Helphingstine | Mar. 16, 1926 |
| 2,532,847 | Junkin | Dec. 5, 1950 |
| 2,652,223 | Peters | Sept. 15, 1953 |
| 2,845,306 | Carver | July 29, 1958 |

FOREIGN PATENTS

| | | |
|---|---|---|
| 1,077,934 | France | May 5, 1954 |